United States Patent [19]
Ehlenbeck

[11] 3,941,494
[45] Mar. 2, 1976

[54] PIPE CLAMP

[76] Inventor: Gary J. Ehlenbeck, 4782 N. Woodruff Ave., Whitefish Bay, Wis. 53217

[22] Filed: Feb. 22, 1974

[21] Appl. No.: 444,721

[52] U.S. Cl. ................ 403/188; 403/196; 403/389
[51] Int. Cl.².... F16B 7/08; F16B 9/00; F16L 41/00
[58] Field of Search .......... 403/109, 110, 188, 192, 403/202, 205, 361, 373, 391, 406, 385, 386, 196, 389

[56] References Cited
UNITED STATES PATENTS

| 192,704 | 7/1877 | Millspaugh | 403/373 |
| 1,546,332 | 7/1925 | Walters | 403/385 X |
| 2,650,106 | 8/1953 | French | 403/110 X |
| 2,894,773 | 7/1959 | Noe | 403/385 |
| 3,300,784 | 1/1967 | Ervine | 403/391 X |
| 3,604,734 | 9/1971 | Friedman | 403/110 X |

FOREIGN PATENTS OR APPLICATIONS

| 91,660 | 11/1966 | France | 403/110 |
| 302,560 | 10/1932 | Italy | 403/385 |

Primary Examiner—Werner H. Schroeder
Assistant Examiner—Wayne L. Shedd
Attorney, Agent, or Firm—Andrus, Sceales, Starke & Sawall

[57] ABSTRACT

A device suitable for being clamped about a pipe has a tubular collar for receiving the pipe. A clamping member mounted on the exterior of the collar includes at least one depending jaw for engaging the pipe. A bolt fastened to the collar extends through the clamping member and a nut on the bolt draws the jaw and pipe into engagement.

14 Claims, 6 Drawing Figures

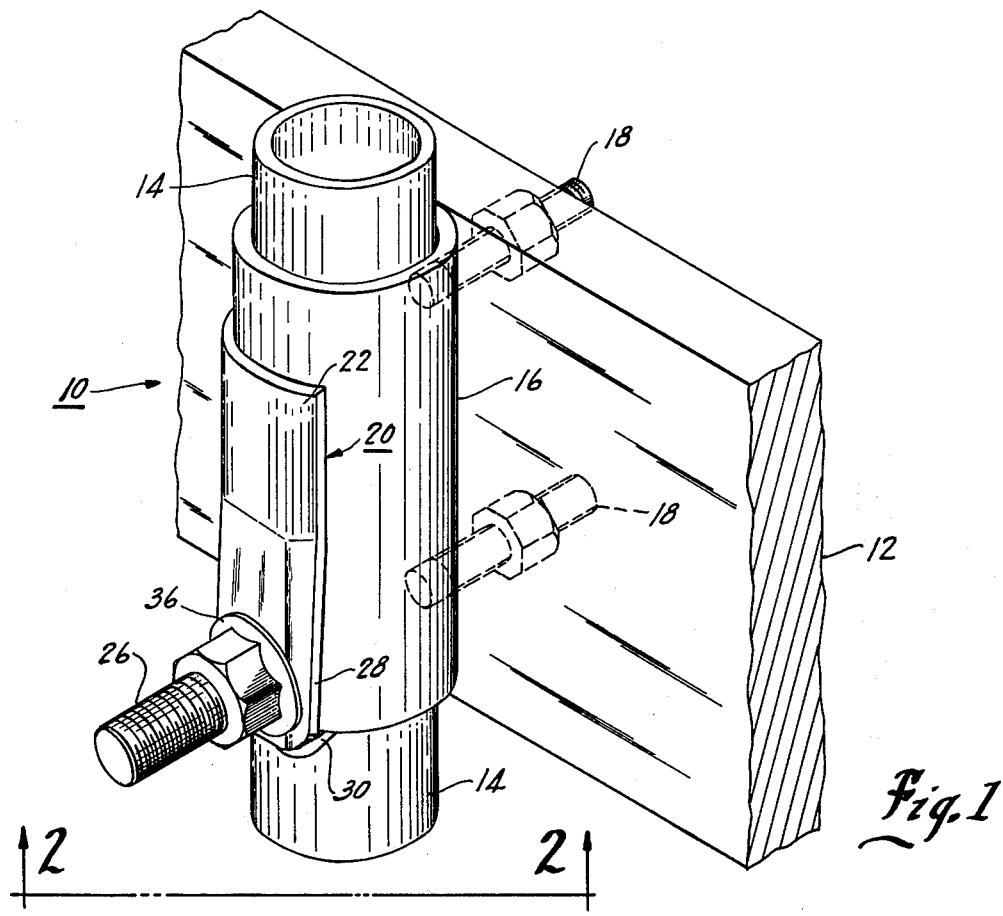
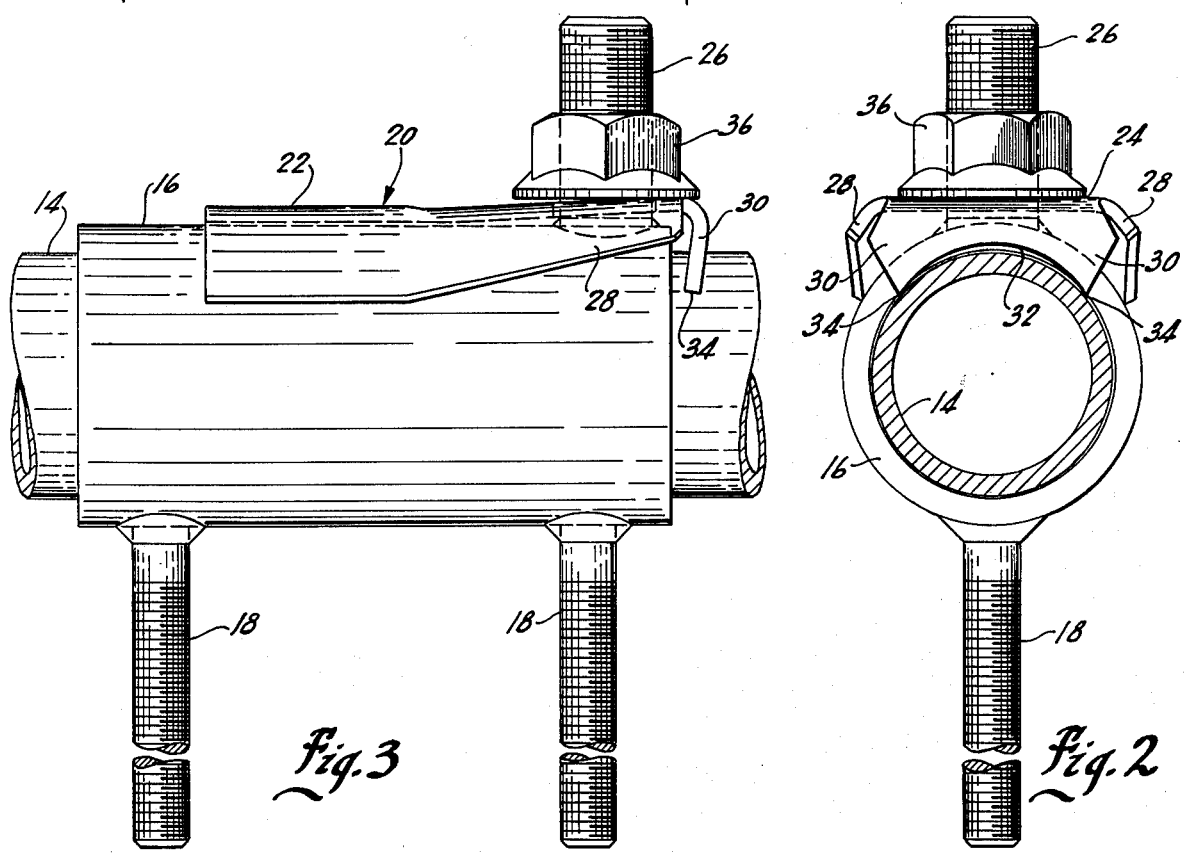

PIPE CLAMP

SUMMARY

Metal pipe forms a common structural element since it combines desirable columnar and flexural strengths with light weight, low cost and wide availability. However, the tubular nature of pipe often renders it difficult to join other elements to the pipe, on either a temporary or permanent basis. While piercing the pipe may provide joinder, special tools or guides may be required. Such joints usually lack the adjustability required in structural applications. Drilling the pipe also reduces its strength or other structural properties.

As a result of the foregoing, various types of clamps have been utilized in the past to grip the pipe without piercing it. The other structural elements are then secured to the clamp. Typically, such clamps employ set screws to grip the pipe. When used in load bearing structures, set screws, with their limited contact area against the pipe, often require a higher quality pipe to secure satisfactory attachment and leave much to be desired in terms of holding strength under various types of loads, resistance to vibration and deterioration and other factors.

It is, therefore, the object of the present invention to provide an improved pipe clamp suitable for permanent or temporary affixation to the exterior of a pipe. The clamp provides a means by which other structural elements may be attached to the pipe. The salient feature of the invention is the exceedingly high strength by which the device grips the pipe. The pipe clamp of the invention exhibits a high resistance to vibration and deterioration. The invention is thus suitable for use in load bearing structures. Such usage is further enhanced by the inclusion of a positive stop means which limits movement of the pipe through the clamp in the event the grip on the pipe should fail because of faulty application, excessive loading, or for other reasons.

The device is simple and economical in construction and manufacture and is easy and rapid to apply, release, or adjust.

BRIEF DESCRIPTION OF THE DRAWINGS

FIG. 1 is a perspective view of one embodiment of the improved pipe clamp of the present invention.

FIG. 2 is an end view taken along line 2—2 of FIG. 1.

FIG. 3 is a side view of the improved pipe clamp of the present invention.

DESCRIPTION OF THE PREFERRED EMBODIMENT

Figure 6:
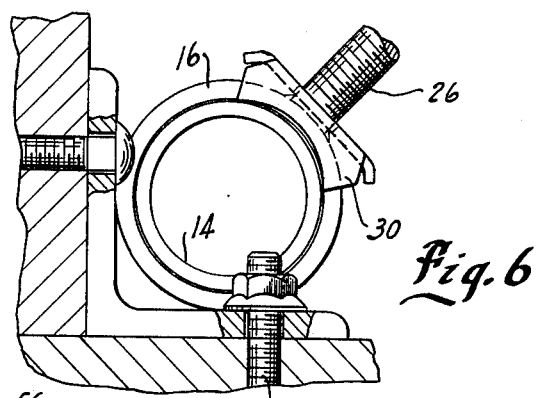
FIG. 6 is an end view of the embodiment of the improved pipe clamp shown in FIG. 4.

Turning now to the Figures, there is shown in FIG. 1 one embodiment of the device of the present invention indicated by the numeral 10. While the device of the present invention has numerous uses, it is shown in FIG. 1 as a means for joining wooden stringer 12 to upright pipe standard 14 as in a scaffolding, pier or dock.

Device 10 includes tubular collar 16 which surrounds pipe 14. The clearance between collar 16 and pipe 14 depends on the particular application of the pipe clamp and on the dimensions of the commercially available plumbing pipe sizes from which collar 16 and pipe 14 are usually formed. The clearance varies with pipe size and manufacturing tolerances and is typically a radial clearance of 1/32 inch on the smaller pipe sizes through 3/16 inch on the larger pipe sizes. Collar 16 may include one or more stud welded bolts 18 suitable for joining stringer 12 to collar 16 by nuts or other appropriate fastener means.

A clamping member 20 is provided on collar 16 to secure the collar and stringer 12 against axial movement along pipe 14. Clamping member 20 includes a first end 22 which is bent to generally the same curvature as collar 16 so as to lie on the exterior surface of the collar when device 10 is in use.

The other end of clamping member 20 has a flattened central portion 24, shown most clearly in FIG. 2 through which extends bolt 26. Bolt 26 may be stud welded near the edge of collar 16. Flanges 28 which slant downward from either side of central portion 24 serve to resist deflection of clamping member 20 when device 10 is in use. Jaw 30 depends from the end of central portion 24 to engage pipe 14. Jaw 30 depends toward pipe 14 a distance in excess of the thicknesses of clamping member 20 and collar 16, plus the height of any weld fillet on bolt 26 and the necessary size and bending tolerances. The radial curvature of jaw surface 32 which engages pipe 14 is less than the radius of the pipe so that the pointed corners 34 of jaw 30 initially engage pipe 14. The radius of curvature of jaw surface 32 may be ⅛ to ¼ inch less than the radius of pipe 14. The width of central portion 24 and the upper portion of jaw 30 is at least as great as the distance between pointed corners 34. As shown in FIG. 3, a slight clearance, on the order of ⅛ inch or more, exists between the inner surface of jaw 30 and the end of collar 16.

Flange nut 36 is threaded on bolt 26 and received by central portion 24 of clamping member 16. Preferably the diameter of the flange of nut 36 is equal to or greater than the distance between pointed corners 34 of jaw 30.

To clamp device 10 on pipe 14, nut 36 is tightened on bolt 26 to move clamping member 20, and specifically jaw 30, into engagement with the exterior surface of pipe 14. Since the radius of curvature of jaw 30 is less than that of pipe 14, the compressive engagement of jaw 30 and pipe 14 is accomplished incrementally. The corners 34 of jaw 30 first engage pipe 14 achieving the initial affixation of clamping device 10 to pipe 14 as by cutting small keyways into the exterior of pipe 14. The action of jaw corners 34 on pipe 14 is facilitated both by the incremental engagement of pipe 14 and jaw 30 and by the mechanical advantage evidenced by the ratio of the greater movement of nut 36 along bolt 26 to the smaller displacement of the pipe metal in a direction perpendicular to the movement of the nut.

As the compressive engagement continues, the entire surface 32 moves into engagement with pipe 14. The flexual stresses generated in jaw 30 and the edge of central portion 24 along which jaw 30 depends are absorbed by the greater depth of jaw 30 that exists above corners 34 than at the center of jaw 30. The edge of flattened central portion 24 and the adjacent portions of jaw 30 assume a beam loading which is resisted by the flange and body of nut 36 and by bolt 26. By placing bolt 26 close to the edge of collar 16 beam loading in the direction parallel to the axis of collar 16 is minimized and is resisted by flange nut 36 acting in conjunction with bolt 28. Side flanges 26 resist deflection of clamping number 20 so as to maximize the compressive force. As noted supra, the depth of jaw 30 from central portion 24 to surface 32 is such as to convert essentially all of the tensile force in bolt 26 into the compression of jaw 30 into pipe 14 around substantially all of the perimeter of jaw 30.

Under conditions of compressive loading, such as commonly encountered in a scaffold or pier, any movement of jaw 30 toward collar 16, responsive to loads tending to move collar 16 downward along pipe 14, would be terminated when the inner surface of jaw 30 strikes the end of collar 16. This prevents any loss of strength which might occur if unlimited jaw deflection of a pivotal nature were permitted in response to such loading.

Figure 4:
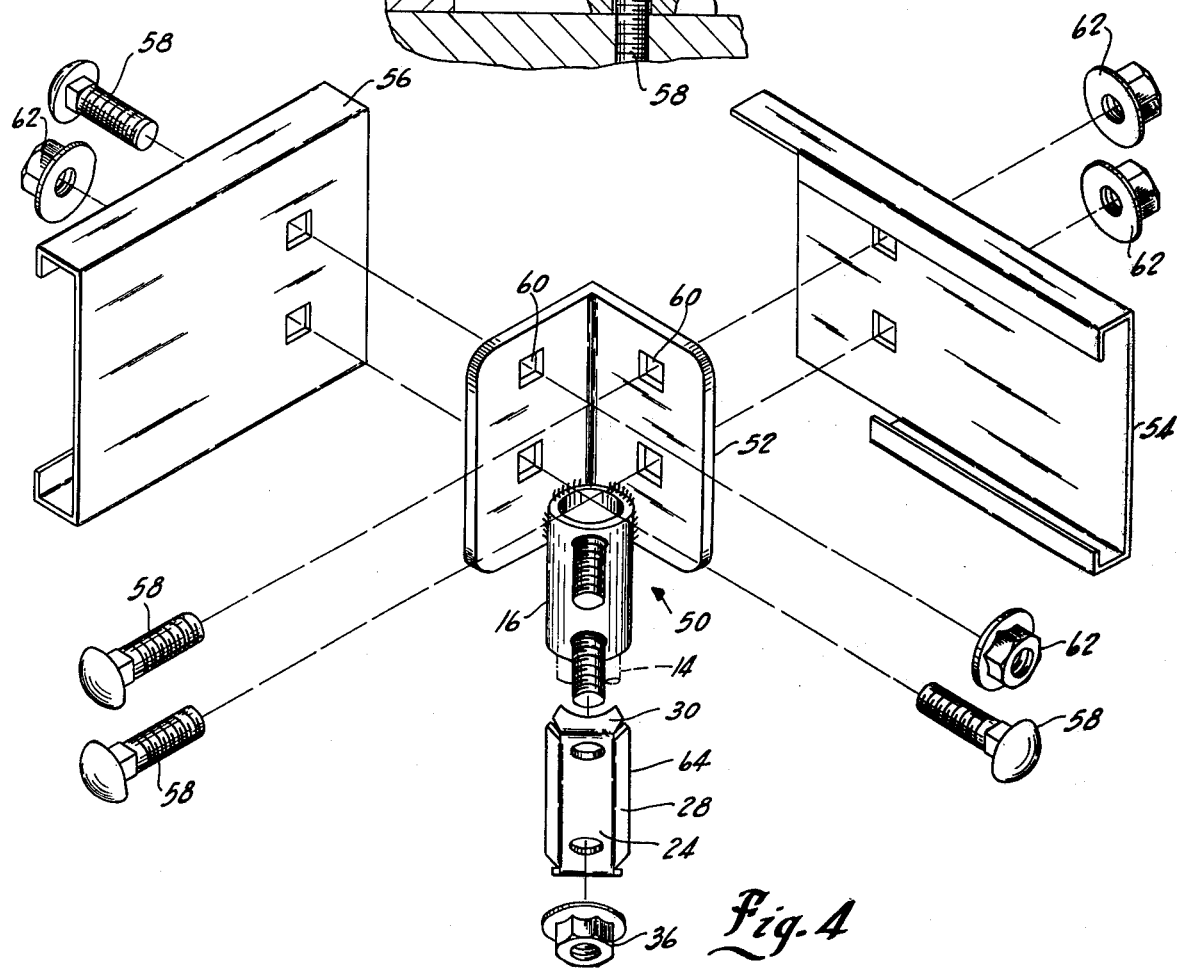
FIG. 4 is an exploded, perspective view of another embodiment of the improved pipe clamp of the present invention.

FIG. 4, shows another embodiment of the clamping device of the present invention suitable for joining a pair of members to the pipe against movement in either direction along the pipe. Clamping device 50 of FIG. 4 includes tubular collar 16 which surrounds pipe 14. Collar 16 includes angle bracket 52 for joining sheet metal stringers 54 and 56 to collar 16 as by means of carriage bolts 58 extending through holes 60 and cooperating nuts 62.

A clamping member 64 is provided on collar 16 to secure the collar and stringers 54 and 56 against axial movement along pipe 14. Clamping member 64 has a depending jaw 30 at either end which engages pipe 14 beyond the extremities of collar 16. The clamping member and jaws may be generally formed as described above in connection with clamping device 10 of FIG. 1. Clamping member 64 includes flattened central portion 24 and stiffening flanges 28. Inasmuch as improper positioning of clamping member 64 may be easily detected by its orientation with respect to collar 16, the clearance of the inner surface of jaw 30 with the extremities of collar 16 may be approximately 1/16 inch at either end of the collar.

Figure 5:
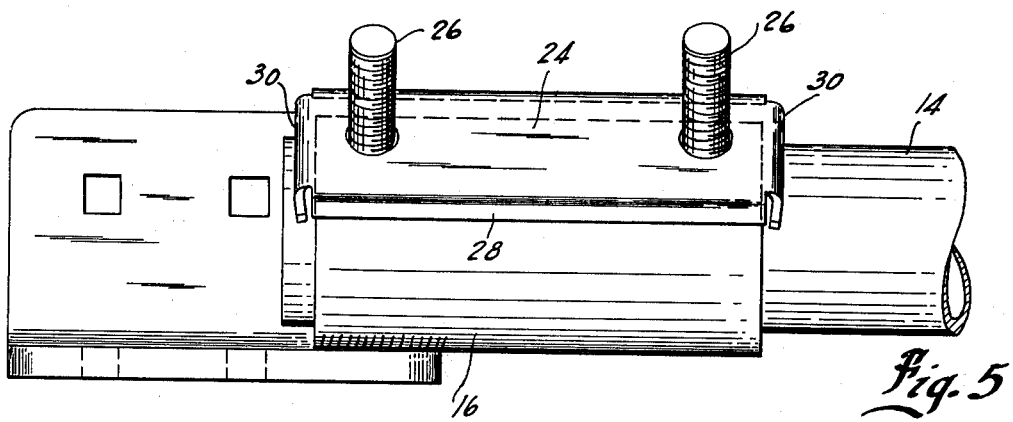
FIG. 5 is a side view of the embodiment of the pipe clamp shown in FIG. 4.

A stud welded bolt 26 is provided adjacent each end of collar 16 as shown in FIG. 5. When nuts 36 are tightened, jaws 30 are moved into engagement with the exterior surface of pipe 14 in the manner described above in connection with clamping device 10. Clamping member 64 does not contact the outer surface of collar 16.

For safety reasons, it is deemed desirable to reverse one of bolts 58 as shown in FIG. 6 so that it extends across the line of movement of pipe 14 should the grip of pipe clamp 50 fail. This limits the amount of movement in the event of such failure. A stud welded bolt or other interferring member mounted on bracket 52 may be similarly employed.

Various modes of carrying out the invention are contemplated as being within the scope of the following claims particularly pointing out and distinctly claiming the subject matter which is regarded as the invention.

I claim:
1. A device affixable to the exterior surface of a pipe, said device comprising:
 a tubular collar suitable for internally receiving the pipe in close proximity thereto;
 a clamping member having a jaw adapted to engage said pipe depending therefrom and extending radially toward the pipe;
 means coupling said clamping member to said collar for drawing said jaw radially into engagement with said pipe for securing said pipe against movement within said collar; and
 a bracket mounted on said collar having bolts extending therethrough for joining other structural elements to said bracket, at least one of said bolts being so located as to extend through said bracket into the path of the pipe through said collar to comprise a means for limiting the movement of the pipe through said collar.

2. The device according to claim 1 wherein said clamping member is formed of a bent sheet material.

3. The device according to claim 2 wherein said jaw is integrally formed with the clamping member and said clamping member includes stiffening flanges along the sides thereof.

4. The device according to claim 1 wherein said coupling means includes a radially extending bolt mounted on said collar adjacent an end thereof and extending through said clamping member, and a nut radially movable along said bolt into abutment with said clamping member to move said jaw into engagement with said pipe.

5. The device according to claim 1 wherein said jaw has a curved surface for engaging said pipe, said curved surface having a radius of curvature less than the radius of said pipe.

6. The device according to claim 5 wherein said curved surface of said jaw has a radius of curvature ⅛ to ¼ inch less than the radius of the pipe.

7. The device according to claim 1 wherein said jaw is integrally formed with the clamping member as an extension bent along a crease normal to the axis of said collar and to the central radius of the curved surface of said jaw.

8. The device according to claim 1 wherein said jaw has a length in the radial direction sufficient to provide the desired engagment with the pipe while avoiding contact between said clamping member and said collar.

9. The device according to claim 1 wherein said clamping member has a first end and a second end, said first end being adapted to mate with the exterior surface of said tubular collar, said second end having said jaw depending therefrom.

10. The device according to claim 9 wherein said first end of said clamping means is semi-circular in cross section for mating with the exterior surface of said tubular collar.

11. The device according to claim 1 wherein said clamping member has a first end and a second end each having a flattened central portion from which a said jaw depends and wherein said collar means include radially extending bolts mounted on said collar adjacent the ends thereof and extending through the flattened central portions of said clamping member and flange nuts movable radially along said bolts into abutment with the flattened central portions of said clamping member.

12. The device according to claim 11 wherein said jaws have a length in the radial direction sufficient to provide the desired engagement with the pipe while avoiding contact between said clamping member and said collar.

13. The device according to claim 1 wherein said clamping member has a flattened central portion from which said jaw depends, said central portion having a width at least as great as said planar projection of the curved surface of said jaw.

14. The device according to claim 13 wherein said coupling means includes a radially extending bolt mounted on said collar adjacent an end thereof and extending through said clamping member, and a nut radially movable along said bolt into abutment with said clamping member to move said jaw into engagement with said pipe, said nut including a flange abutting said flattened central portion having a diameter at least as great as the planar projection on the surved surface of said jaw.

* * * * *